United States Patent
Jackson

(10) Patent No.: US 7,351,277 B2
(45) Date of Patent: Apr. 1, 2008

(54) IR TRANSPARENT CYAN INKJET INK

(75) Inventor: Christian Jackson, Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 9 days.

(21) Appl. No.: 11/208,894

(22) Filed: Aug. 22, 2005

(65) Prior Publication Data
US 2006/0050119 A1 Mar. 9, 2006

Related U.S. Application Data

(60) Provisional application No. 60/608,349, filed on Sep. 8, 2004.

(51) Int. Cl.
C09D 11/02 (2006.01)
B41J 2/01 (2006.01)

(52) U.S. Cl. .................. 106/31.27; 106/31.32; 347/100

(58) Field of Classification Search ......... 106/31.27, 106/31.32; 347/100
See application file for complete search history.

(56) References Cited

U.S. PATENT DOCUMENTS

| | | |
|---|---|---|
| 4,750,937 A | 6/1988 | Botros |
| 5,085,698 A | 2/1992 | Ma et al. |
| 5,093,147 A | 3/1992 | Andrus et al. |
| 5,336,174 A | 8/1994 | Daoud et al. |
| 5,423,432 A | 6/1995 | Krutak et al. |
| 5,461,136 A | 10/1995 | Krutak et al. |
| 5,990,197 A | 11/1999 | Escano et al. |
| 6,149,719 A | 11/2000 | Houle |
| 6,378,976 B1 | 4/2002 | Byers et al. |
| 6,695,899 B1 | 2/2004 | Mistry |
| 2003/0035034 A1 | 2/2003 | Fukumoto et al. |
| 2005/0235867 A1* | 10/2005 | Jackson et al. .......... 106/31.27 |
| 2006/0050120 A1* | 3/2006 | Jackson ................... 347/100 |
| 2006/0105265 A1* | 5/2006 | Michel et al. ............ 430/236 |

FOREIGN PATENT DOCUMENTS

| | | |
|---|---|---|
| EP | 0 262821 | 4/1988 |
| EP | 0 612 820 | 8/1994 |
| WO | WO 00/43453 | 7/2000 |

OTHER PUBLICATIONS

International Search Report for International Appln. PCT/US2005/031154, dated Feb. 2006.

* cited by examiner

Primary Examiner—Helene Klemanski

(57) ABSTRACT

The present invention pertains to a cyan dye-based inkjet ink having substantially no absorption in the near-infrared region of the spectrum (near-IR transparent). The invention further pertains to a dye-based inkjet ink set comprising this near-IR transparent cyan ink.

12 Claims, No Drawings

IR TRANSPARENT CYAN INKJET INK

CROSS-REFERENCE TO RELATED APPLICATIONS

This application claims priority under 35 U.S.C. §119 from U.S. Provisional Application Ser. No. 60/608,349 (filed Sep. 8, 2004), the disclosure of which is incorporated by reference herein for all purposes as if fully set forth.

BACKGROUND OF THE INVENTION

The present invention pertains to a dye-based inkjet ink that is cyan in color and that has substantially no absorption in the near-infrared region of the spectrum (IR transparent). The invention further pertains to a dye-based inkjet ink set comprising this IR transparent cyan ink.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

There is commercial interest in providing intelligible markings on the surface of articles that are virtually invisible to the human eye, but which can be detected, for example, by a scanning device. Such markings can be used for authentication, sorting and other uses. It is further desirable to combine invisible markings with colored images and in particular colored images created by inkjet printing. The colored images preferably do not interfere with the detection of the invisible markings.

To create invisible markings, it is known to use near-infrared (IR) absorbing and infrared fluorescent compounds which have minimal light absorption in the visible light wavelength range of about 400-700 nm, and which have strong light absorbance in the near infrared wavelength region of about 700-900 nm. These compounds may also have accompanying fluorescence to produce fluorescent radiation having wavelengths longer than the wavelength of excitation. See, for example, U.S. Pat. No. 5,093,147, U.S. Pat. No. 5,336,174, U.S. Pat. No. 5,423,432 and U.S. Pat. No. 5,461,136, the disclosures of which are incorporated by reference herein for all purposes as if fully set forth. The infrared absorbance or fluorescence is detected by IR sensitive devices such as cameras and sensors.

Invisible infrared inks have been disclosed for ink jet printing. For example, U.S. Pat. No. 5,990,197 (the disclosure of which is incorporated by reference herein for all purposes as if fully set forth) discloses an organic solvent based polyester ink formulation having an infrared fluorescing compound suitable for ink jet printing.

To achieve full color images, ink jet printers typically employ a cyan, magenta and yellow ink (CMY ink set). These colors are known as subtractively-mixing primaries as light is subtracted as it passes through the colorant. These three colored inks can be used to print the entire range of hues. Inks sets commonly comprise, in addition, a black ink (CMYK ink set).

When used in combination with an IR absorbing/fluorescing marker, an ink set will preferably be non-absorbing (transparent) in the near-infrared region. Many magenta, yellow and black dyes commonly employed in current practice are satisfactorily transparent in this region of the spectrum. The notable exception is the cyan dye.

Cyan colored inkjet inks generally employ a copper phthalocyanine-based chromophore, for example, Direct Blue 199. Phthalocyanines, however, are widely known to absorb in the infrared (see, for example, *The Phthalocyanines*, Vol 1. Moser et al. CRC Press). At present, there are no practical alternative cyan chromophores that are sufficiently transparent in the near-IR region to be of use in marking applications with IR markers.

There is a need in the art for a cyan inkjet ink and a CMY inkjet ink set that is substantially IR transparent.

SUMMARY OF THE INVENTION

In one aspect, the present invention pertains to a cyan inkjet ink having a hue angle of between about 180 and 250, comprising a vehicle and a soluble colorant, wherein the colorant comprises a first blue dye and a second dye selected from the group consisting of a yellow dye, a green dye and mixtures thereof, and wherein the cyan ink is substantially transparent in the near-IR region (700-900 nm).

It was found that these colorants could be combined to provide a satisfactory cyan ink without significant absorbance in the near-IR region (substantially transparent in the near-IR region (700-900 nm)), and thus avoiding the IR absorbance issues associated with typical cyan dyes.

In another aspect, the present invention pertains to an inkjet ink set comprising at least three colored visible inks, wherein the at least three colored visible inks comprise a first ink cyan in color, a second ink magenta in color and a third ink yellow in color, wherein each of the first, second and third inks individually comprises a vehicle and a soluble colorant, wherein the colorant in the first ink comprises a first blue dye and a second dye selected from the group consisting of a yellow dye, a green dye and mixtures thereof, and wherein the colored visible inks of the ink set are substantially transparent in the near-IR region (700-900 nm).

By "visible" is meant visible to the normal human eye (unaided).

Preferably, the above cyan ink and inks of the ink set contain substantially no individual colorant that in and of itself is cyan in color. "Substantially" in this context does not exclude trace amounts of such a cyan colorant, but is especially preferred to have no such cyan colorant.

The ink set may include one or more additional substantially near-IR transparent, colored, visible inks such as, for example, a black, blue, green and/or red ink. In a preferred embodiment, the ink set further includes a black ink.

The inventive ink set is especially advantageous for use in combination with a substantially invisible, near-IR absorbing or fluorescing marking, as the invisible marking can still be detected through the colored inks.

The invisible markings can be applied by any suitable means. For example, invisible IR-detectable markings can applied to a substrate by traditional analog printing methods, and visible images can be applied by inkjet printing with the inventive ink set.

In a preferred embodiment, the inventive ink set further comprises a substantially colorless ink (invisible ink) with an IR-detectable marker, and invisible markings are digitally applied as part of the inkjet printing process with the inventive ink set.

The present invention further includes a method for ink jet printing onto a substrate, comprising the steps of:

(a) providing an ink jet printer that is responsive to digital data signals;

(b) loading the printer with a substrate to be printed;

(c) loading the printer with an inkjet ink set forth above; and (d) printing onto the substrate using the inkjet ink set in response to the digital data signals.

The substrate to be printed according to the inventive method can contain invisible markings that absorb or fluoresce in the near infrared, and which invisible markings remain detectable when underprinted and/or overprinted with the colored inks of the ink set.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Colored Inks

Colored visible inks in the ink set of the present invention comprise a vehicle, preferably an aqueous vehicle, and colorant soluble in the vehicle (dye). The colored visible inks should be substantially transparent in the near-IR region (700-900 nm).

Conventional dyes, such as anionic, cationic, amphoteric and non-ionic dyes, are useful in this invention. Such dyes are well known to those of ordinary skill in the art. Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

Anionic dyes include, for example, Acid, Direct, Food, Mordant and Reactive dyes. Classes of anionic dyes include nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds and indigoid compounds.

Cationic dyes include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds and oxazine compounds.

Whenever possible, dyes are referred to herein by their "C.I." designation established by Society Dyers and Colourists, Bradford, Yorkshire, UK and published in the *The Color Index*, Third Edition, 1971. That designation uses a perceived color as part of the name, but there is no formal spectral definition of what constitutes orange, red, violet, blue, green, etc. For the purposes of this invention, ink color (hue) will be named according to hue angle ranges as follows.

| Color | Hue Angle Range |
| --- | --- |
| Red | 10-70 |
| Yellow | 70-120 |
| Green | 120-180 |
| Cyan | 180-250 |
| Blue | 250-320 |
| Magenta | 320-10 |

In choosing colorants for an ink set, the hue angle for a given color preferably falls within the following ranges (between about x to about y).

| Color | Hue Angle Range |
| --- | --- |
| Red | 15-65 |
| Yellow | 75-110 |
| Green | 135-165 |
| Cyan | 195-230 |
| Blue | 265-305 |
| Magenta | 325-360 |

The hue angle is determined by spectrophotometric measurement of a solution or by printing an ink onto high quality inkjet media, such as photo paper, and measuring the color with a spectrometer. In the case where hue angle differs substantially between methods, the solution measurement should be preferred.

Dyes are selected for transparency in the near-IR region. By "substantially transparent in the near-IR region" is meant that a dye is substantially non-absorbing in the near-IR region of 700 to 900 nm. A near-IR transparent dye has sufficiently low background absorbance that it will not interfere with the detection of invisible IR absorbant/fluorescent markings. To the extent that absorbance information is not generally published or available for specific dyes, it can be readily determined by a person of ordinary skill in the art via routine measurement with a spectrophotometer. "Substantially transparent in the near-IR region" in the context of the present invention does not exclude the presence of some absorption overlap of a colorant in the near-IR region but, again, the absorption should not be so much as to significantly interfere with the detection of invisible IR absorbant/fluorescent markings. The absorption of the colorants in the near-IR region is generally a "shoulder" from the peak in the visible, and colors with visible absorption at longer wavelengths (i.e. closer to 700 nm) have more of a problem with tail of the peak extending into the near-IR region. A soluble colorant (dye) can be useful in this invention if there is a broad region of relatively low absorption in the 700 to 900 nm range. For all points in the 850-900 nm region, the absorbance ratio of the colorants is preferably about 1% or less. For all points in the 800-900 nm range, the absorbance ratio is preferably about 2% or less, more preferably about 1.5% or less, and especially about 1% or less. For all points in the 750-900 nm range, and even more preferably for all points in the entire 700-900 nm range, the absorbance ratio is preferably less than about 7.5%, more preferably about 6.5% or less, still more preferably about 5% or less, and especially about 3% or less.

The absorbance ratio can be calculated from the measurement of the visible and near-IR spectrum of a colorant as an aqueous solution. The absorbance ratio is the absorbance at a point in the near-IR region divided by the absorbance at the maximum point in the visible region. The wavelength of maximum absorbance in the visible region will generally vary with each colorant. The absorbance ratio is expressed as percent (ratio multiplied by 100).

Cyan Ink

The colorant for the cyan ink comprises a first dye blue in color and a second dye green or yellow in color. The proportion of each dye present in the ink is adjusted to provide the final ink with a cyan hue (having hue angle of between about 180 and 250).

Useful dyes include (blue) Reactive Blue 49, Reactive Blue 19, Reactive Blue 72, Reactive Blue 21, Acid Blue 83 and Acid Blue 260; (yellow) Direct Yellow 86, Direct Yellow 132 and Acid Yellow 23; and (green) Reactive Green 12. Mixtures of any of the above may also be used.

The blue and yellow dyes particularly useful as colorants in the cyan ink are those selected from the group consisting of (blue) Reactive Blue 49 and Reactive Blue 19; and (yellow) Direct Yellow 132, Direct Yellow 86 and Acid Yellow 23. Mixtures may also be used.

Other Colored Inks

In addition to the above listed dyes, useful dyes for other colored inks include (magenta) Acid Red 52, Reactive Red 180, Acid Red 37 and Reactive Red 23; and (red) Reactive Orange 16, Reactive Red 123, Reactive Red 43, Reactive Orange 13, Acid Red 337 and Acid Red 415. Mixtures of the above are also suitable.

Inks may also be formed from a mixture of dyes, for example, a red ink may be a mixture of Reactive Red 180 and Reactive Yellow 84, and a green ink may be a mixture of Reactive Blue 72 and Reactive Yellow 85. The "dye content" in a given ink refers the total dye present in that ink, whether a single dye species or a combination of two or more dye species.

An ink set may also include a black ink. Useful black dyes include DK 31, DB 195, Food Black 2, AK 194 and AK 172.

Vehicle

The vehicle is a carrier for the colorant, and can be aqueous or nonaqueous.

An "aqueous vehicle" refers to a vehicle comprised of water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

Inks based on aqueous vehicles can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n- propyl ether, and dipropylene glycol mono-isopropyl ether. 1,2-Alkanediols are preferably 1,2-C4-6 alkanediols, most preferably 1,2- hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

"Nonaqueous vehicle" refers a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of mono-, di- and tri-propylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products.

Even when no water is deliberately added to the nonaqueous vehicle, some adventitious water may be carried into the formulation, but generally this will be no more than about 2-4%. By definition, the nonaqueous ink of this invention will have no more than about 10%, and preferably no more than about 5%, by weight of water based on the total weight of the nonaqueous vehicle.

Other Ingredients

Other ingredients may be formulated into an inkjet ink, to the extent that such other ingredients do not interfere with the stability and jetability of the ink, as well as the near-IR transparency of the colored inks, which may be readily determined by routine experimentation. Such other ingredients are in a general sense well known in the art.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N'',N'''-tetraacetic acid (GEDTA), and salts thereof, may be advantageous, for example, to eliminate deleterious effects of heavy metal impurities.

Invisible Inks

The inventive cyan ink and ink sets can be used in combination with an invisible inkjet ink.

An ink set can comprise an invisible ink. "Invisible" in this context means substantially invisible to the normal human eye (unaided), but detectable by absorbance or fluorescence in the near-IR region.

Invisible inks in the context of the present invention comprise a vehicle and an IR marker.

Suitable vehicles (and optional components) are the same as set forth above for the colored inks.

The IR marker is generally, but not necessarily, a soluble dye. Infrared absorbing dyes include pentamethinecyanines, metal phthalocyanines, anthroquinone dyes, naphthoquinone dyes, dithiol and dithiene metal complexes, and squarylium dyes (see, for example *Color Chemistry*, Heinrich Zollinger VCN 1987). Examples of infrared-absorbing dyes in ink-jet inks are found in U.S. Pat. No. 6,378,976 and U.S. Pat. No. 6,149,719 (the disclosures of which are incorporated by reference herein for all purposes as if fully set forth), and previously incorporated U.S. Pat. No. 5,990,197.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and preferably about 80% to about 99.8%, based on total weight of the ink.

The colorant (and IR marker) will generally be present in amounts up to about 12%, and more typically in the range of about 0.1 to about 9%, by weight of the total ink.

Other ingredients (additives), when present, generally comprise less than about 15% by weight, based on the total weight of the ink. Surfactants, when added, are generally in the range of about 0.2 to about 3% by weight based on the total weight of the ink. Polymers can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the application contemplated by this invention will generally require lower viscosity ink. Thus the viscosity (at 25° C.) of the inks can be less than about 7 cps; less than about 5 cps, and less than about 3.5 cps.

Ink Set

The inventive cyan ink is advantageously used a member of an ink set. The term "ink set" refers to all the individual fluids an inkjet printer is equipped to jet. These fluids include all colored inks, all invisible inks and all non-colored inks. Non-colored (colorless) inks are inks with neither colorant nor IR detectable compound and are generally used to fix or enhance the durability of the colored inks or to enhance or equalize gloss.

A CYM ink set can, for example, comprise the inventive cyan ink in combination with:

an IR transparent magenta ink comprising a colorant selected from one or a combination of Acid Red 52, Reactive Red 180, Acid Red 37 and Reactive Red 23; and an IR transparent yellow ink comprising a colorant selected from one or combination of Direct Yellow 86, Direct Yellow 132 and Acid Yellow 23.

The ink set can further comprise an IR transparent black ink comprising colorant selected from one or combination of DK 31, DB 195, Food Black 2, AK 194 and AK 172.

EXAMPLES

Measurements

Inks were printed with a Canon i550 printer onto Xerox 4024 paper, Epson Photo Quality IJ paper and Epson Premium Photo Paper. Color values were measured using a Greytag-Macbeth Spectrolino spectrometer.

The hue angle of a dye in solution was measured with a Hewlett Packard 8453 UV-Visible Spectrophotometer. The dye solution was diluted until the absorbance of the peak absorbance wavelength, lambda max, was between 0.4 and 0.8 absorbance units. The instrument software calculated the $L^*a^*b^*$ values and hue and chroma automatically from the measured spectrum.

Preparation of Inks

Inks were prepared according to the following formulations. Proportions are in percent weight of the total weight of ink. Ingredients were mixed together and filtered. Water was deionized. Surfynol® 465 is a surfactant from Air Products Corp (Allentown, Pa., USA). Proxel™ GXL is a Biocide from Avecia (Wilmington, Del., USA). TRIS is tris(hydroxymethyl)aminomethane, a buffer.

| Ingredients | Ink A | Ink 1 | Ink 2 | Ink 3 | Ink 4 | Ink 5 | Ink 6 |
| --- | --- | --- | --- | --- | --- | --- | --- |
| Direct Blue 199 | 2.1 | — | — | — | — | — | — |
| Reactive Blue 49 | — | — | 3.0 | — | — | 3.0 | — |
| Reactive Blue 19 | — | 2.0 | — | 2.25 | 3.0 | — | 1.5 |
| Sanolin Green R-3GL | — | 2.0 | 1.0 | 0.75 | — | — | 0.5 |
| Jettex ® Green 2GM | — | — | — | — | — | 1.0 | — |
| Direct Yellow 132 | — | — | — | — | 0.25 | — | — |
| Glycerol | 10 | 10 | 10 | 10 | 10 | 10 | 10 |
| Surfynol ® 465 | 0.5 | 0.5 | 0.5 | 0.5 | 0.5 | 0.5 | 0.5 |
| Proxel ® GXL | 0.2 | 0.2 | 0.2 | 0.2 | 0.2 | 0.2 | 0.2 |
| TRIS | 0.2 | 0.2 | 0.2 | 0.2 | 0.2 | 0.2 | 0.2 |

-continued

| Ingredients | Ink A | Ink 1 | Ink 2 | Ink 3 | Ink 4 | Ink 5 | Ink 6 |
|---|---|---|---|---|---|---|---|
| Water | Bal.to 100 | Bal.to 100 | Bal.to 100 | Bal.to 100 | Bal.to 100 | Bal.to 100 | Bal.to 100 |

The optical density, chroma and hue angle for these inks on various media is summarized in the following table.

|  | Ink A | Ink 1 | Ink 2 | Ink 3 | Ink 4 | Ink 5 | Ink 6 |
|---|---|---|---|---|---|---|---|
| Optical Density | | | | | | | |
| Xerox 4024 | 0.64 | 0.78 | 0.67 | 0.77 | 0.68 | 0.65 | 0.63 |
| Epson Photo Quality IJ paper | — | 0.97 | 0.82 | 0.93 | 0.94 | 0.87 | 0.59 |
| EpsonPremium Photo Paper | 0.67 | 1.03 | 0.81 | 0.89 | 0.89 | 0.78 | 0.59 |
| Chroma | | | | | | | |
| Xerox 4024 | 44 | 24 | 23 | 29 | 18 | 17 | 29 |
| Epson Photo Quality IJ paper | — | 32 | 31 | 40 | 24 | 27 | 36 |
| EpsonPremium Photo Paper | 60 | 38 | 33 | 42 | 28 | 29 | 35 |
| Hue Angle | | | | | | | |
| Xerox 4024 | 229 | 227 | 249 | 254 | 237 | 217 | 253 |
| Epson Photo Quality IJ paper | — | 229 | 250 | 260 | 244 | 227 | 258 |
| EpsonPremium Photo Paper | 215 | 221 | 242 | 252 | 232 | 220 | 251 |

IR Transparency

The following results show the near-IR transparency of the inventive and comparative inks above. The visible and near infrared spectrum of the inks, diluted as necessary to stay on scale, was measured and the absorbance ratio at various points calculated. The absorbance ratio was the absorbance at a point in the near IR divided by the absorbance at the maximum point in the visible. The sample points in the near IR were chosen to be 700, 750, 800 and 850 nm. The wavelength of maximum absorbance in the visible varied with each ink. The results summarized below are expressed as percent—a lower value indicates greater near-IR transparency.

| Ink | A (700 nm)/A (Max 400-700) | A (750 nm)/A (Max 400-700) | A (800 nm)/A (Max 400-700) | A (850 nm)/A (Max 400-700) |
|---|---|---|---|---|
| Ink A (Comp.) | 27.0 | 8.3 | 5.1 | 4.0 |
| Ink 1 | 16.9 | 1.6 | 0.4 | 0.0 |
| Ink 2 | 11.0 | 1.0 | 0.1 | 0.0 |
| Ink 3 | 13.0 | 1.9 | 0.4 | 0.1 |
| Ink 4 | 3.4 | 0.0 | 0.0 | 0.0 |
| Ink 5 | 12.5 | 1.4 | 1.1 | 1.0 |
| Ink 6 | 16.3 | 0.6 | 0.2 | 0.1 |

The absorption in the near-IR region is generally a "shoulder" from the peak in the visible region, and dyes (such as cyan dyes) with visible absorption at longer wavelengths (i.e. closer to 700 nm) have more of a problem with the tail of the peak extending into the near IR. This can be seen for comparative Ink A above which comprises a cyan dye. The maximum IR absorption occurs at 700 nm and tails off at longer wavelengths, although for this particular colorant it never seems to hit a low baseline level. In contrast the inventive inks with non-cyan dyes very quickly achieve baseline levels of IR absorption.

An alternative method of evaluating IR transparency is provided in the following table. Here, the sum of the absorbance in the near-IR region was divided by the sum of the absorbance in the visible region, and the results expressed in percent. A lower value indicates greater transparency. Again the relative ranking of colorant for transparency is similar to the previous method.

| Ink | Sum A (700-900 nm)/Sum A (400-700 nm) |
|---|---|
| Ink A (Comp) | 13.2 |
| Ink 1 | 2.0 |
| Ink 2 | 0.9 |
| Ink 3 | 1.7 |
| Ink 4 | 0.0 |
| Ink 5 | 4.1 |
| Ink 6 | 2.4 |

The invention claimed is:

1. A cyan inkjet ink having hue angle of between about 180 and 250, comprising a vehicle and soluble colorant, wherein the colorant comprises a first dye selected from the group consisting of Reactive Blue 49, Reactive Blue 19, Reactive Blue 72, Reactive Blue 21, Acid Blue 83, Acid Blue 260 and mixtures thereof; and a second dye selected from the group consisting of Direct Yellow 86, Direct Yellow 132, Acid Yellow 23, Reactive Green 12 and mixtures thereof.

2. The ink of claim 1, wherein the first dye is selected from the group consisting of Reactive Blue 49, Reactive Blue 19 and mixtures thereof; and the second dye is selected from the group consisting of Direct Yellow 132, Direct Yellow 86, Acid Yellow 23 and mixtures thereof.

3. An inkjet ink set comprising at least three colored visible inks, wherein the at least three colored visible inks comprise a first ink cyan in color, a second ink magenta in color and a third ink yellow in color, wherein each of the first, second and third inks individually comprises a vehicle and a soluble colorant, wherein the first ink is a cyan ink having a hue angle of between about 180 and 250, comprising a vehicle and soluble colorant, wherein the colorant comprises a first blue dye and a second dye selected from the group consisting of a yellow dye, a green dye and mixtures thereof, and wherein the visible inks of the ink set are substantially transparent in the near-infrared region.

4. The ink set of claim 3, wherein the inks of the ink set contain substantially no individual colorant that in and of itself is cyan in color.

5. The ink set of claim 3, wherein the magenta ink has a hue angle of between 320 and 10; and the yellow ink has a hue angle of between 70 and 120.

6. The ink set of claim 3, wherein the colorants in the visible inks have an absorbance ratio in the 850-900 nm region of about 1% or less; and/or an absorbance ratio in the 800-900 nm region of about 2% or less; and/or an absorbance ratio in the 750-900 nm region of about 7.5% or less.

7. The ink set of claim 3, further comprising a fourth ink black in color comprising a vehicle and a black colorant.

8. The ink set of claim 3, wherein the vehicle of each ink in the ink set is, individually, an aqueous vehicle.

9. The ink set of claim 3, wherein the colorant In the second ink is selected from the group consisting of Acid Red 52, Reactive Red 180, Acid Red 37, Reactive Red 23 and mixtures thereof; and/or the colorant in the third ink is selected from the group consisting of Direct Yellow 86, Direct Yellow 132, Acid Yellow 23 and mixtures thereof.

10. The ink set of claim 3, further comprising an invisible ink comprising a vehicle and an infrared marker.

11. A method for ink jet printing onto a substrate, comprising the steps of:

(a) providing an ink jet printer that is responsive to digital data signals;

(b) loading the printer with a substrate to be printed;

(c) loading the printer with an ink set; and (d) printing onto the substrate using the ink set in response to the digital data signals, wherein the ink set comprises at least three colored visible inks, wherein the at least three colored visible inks comprise a first ink cyan in color, a second ink magenta in color and a third ink yellow in color, wherein each of the first second and third inks individually comprises a vehicle and a soluble colorant, wherein the first ink is a cyan ink having a hue angle of between about 180 and 250, comprising a vehicle and soluble colorant, wherein the colorant comprises a first blue dye and a second dye selected from the group consisting of a yellow dye, a green dye and mixtures thereof, and wherein the visible inks of the ink set are substantially transparent in the near-infrared region.

12. The method of claim 11, wherein the substrate to be printed contains invisible markings that absorb or fluoresce in the near-infrared region, and which invisible markings remain detectable when overprinted with the visible inks of the ink set.

* * * * *